United States Patent

Peterson

[11] 3,818,646
[45] June 25, 1974

[54] FIXTURE FOR HOLDING PRECISELY SHAPED PARTS

[75] Inventor: Russell D. Peterson, Hershey, Pa.

[73] Assignee: TRW Inc., Cleveland, Ohio

[22] Filed: Jan. 12, 1973

[21] Appl. No.: 323,251

[52] U.S. Cl............... 51/217 R, 269/106, 269/138, 269/266
[51] Int. Cl....... B24b 41/06, B25b 1/20, B25b 1/24
[58] Field of Search........... 51/217 R; 269/104, 105, 269/106, 110, 266, 321 W

[56] References Cited
UNITED STATES PATENTS

| | | | |
|---|---|---|---|
| 2,565,925 | 8/1951 | Lombard et al. | 51/217 R |
| 2,754,708 | 7/1956 | Peterson | 269/266 X |
| 2,882,656 | 4/1959 | Novkov | 51/217 R |
| 3,108,508 | 10/1963 | Warden | 269/266 X |

Primary Examiner—Roy Lake
Assistant Examiner—Neil Abrams
Attorney, Agent, or Firm—Hill, Gross, Simpson, Van Santen, Steadman, Chiara & Simpson

[57] ABSTRACT

A fixture for holding precisely shaped parts such as blades for jet turbine engines for accurately positioning the parts to enable subsequent grinding or machining operations to be carried out precisely. The fixture includes a base with opposed sidewalls extending therefrom, the sidewalls being spaced to provide a slot of sufficient width to receive the arcuately shaped portions of a turbine blade or the like. Seating means are provided for seating edge portions of the workpiece in the fixture, and a plurality of individually movable pins are positioned to extend from each of the sidewalls into the slot to engage the arcuately shaped portion of the workpiece.

3 Claims, 6 Drawing Figures

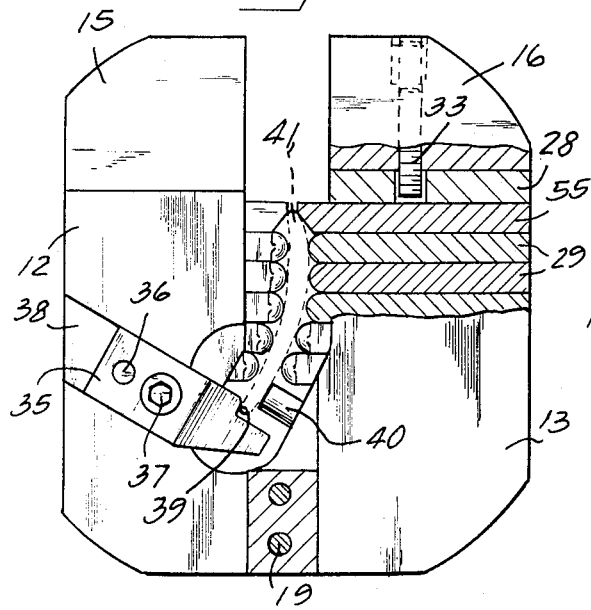
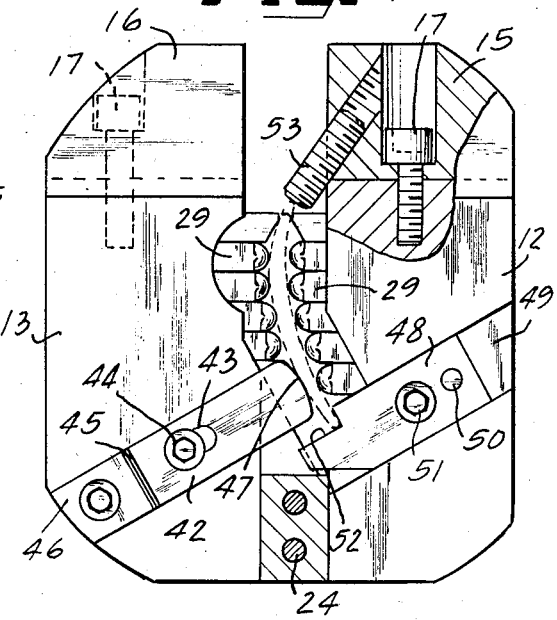
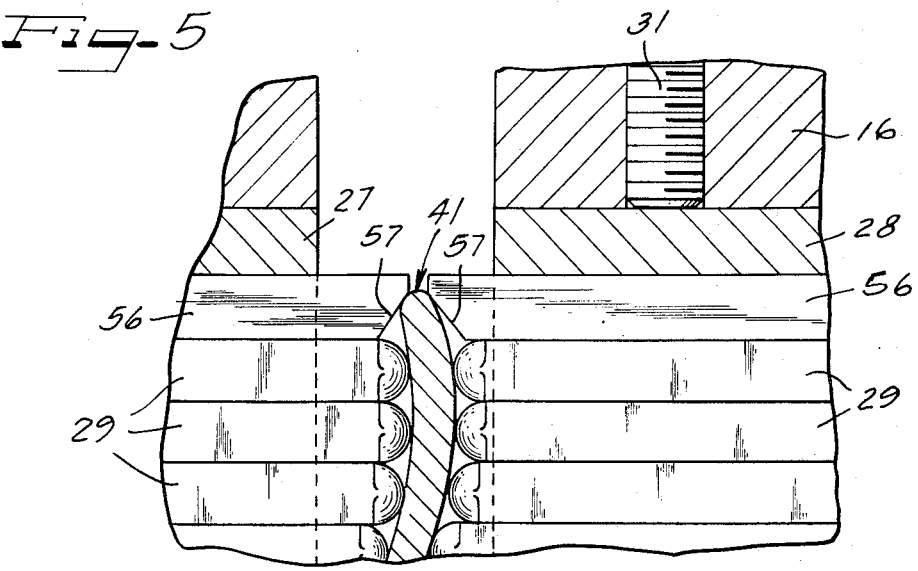
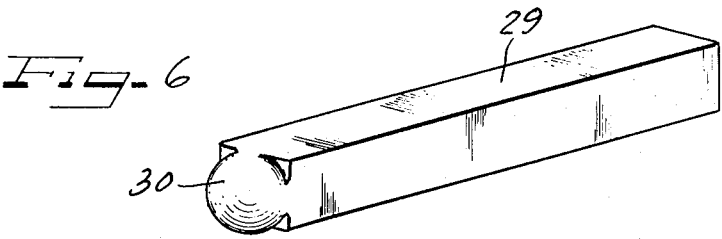

FIXTURE FOR HOLDING PRECISELY SHAPED PARTS

BACKGROUND OF THE INVENTION

1. Field of the Invention

This invention is in the field of fixtures for holding precisely shaped parts to insure that the parts will be in correct alignment for subsequent grinding or machining operations.

2. Description of the Prior Art

One of the more commonly used techniques for fixturing precisely shaped parts such as blades for jet turbine engines has been the encapsulation of at least a part of the blade in a low melting alloy containing lead. The procedure involved inserting the part into a hollow cast iron block having a cavity therein which is much larger than the dimensions of the part. A molten low melting lead containing alloy was then poured into the cavity of the cast iron block to encapsulate the part and hold it for subsequent manufacturing operations. The part was normally supported within the cavity by means of guillotine knife edges on both ends which was found to be quite undesirable because it provided too great a margin for error, for example, when a datum plane was to be formed on selected surfaces of the part. Additionally, the lead of the alloy was found to have a tendency to contaminate the metal of the part since it was difficult to eliminate completely the low melting alloy from the surface of the part without such contamination occurring.

As is well known, blades for jet engine turbines must be precisely formed to close tolerances. Unless such tolerances are observed, the cumulative effect is an inability to achieve the required air flow pattern which is critical to the efficient operation of the jet turbine engine.

One of the critical areas of manufacturing blading for jet turbine engines exists in establishing an initial properly oriented datum plane on the casting or forging of the blade on which subsequent machining is to take place. The fixture of the present invention is particularly designed to hold such a blade precisely while the datum planes are ground or machined into the exposed portions of the blade. Once the datum planes are established, subsequent machining operations can be carried out with assurance that the aerodynamic tolerances required of the blades in the engine will be met.

SUMMARY OF THE INVENTION

The present invention provides an improved fixturing device for holding an air foil shaped workpiece for subsequent working thereof and comprises a fixture base which has opposed sidewalls extending from the base, the sidewalls being spaced sufficiently to provide a slot of sufficient width to receive the arcuate portions of the workpiece. Seating means are provided for seating edge portions of the workpiece in the fixture initially, and a plurality of individually movable pins extends from each of the sidewalls into the slot to engage the arcuate portions of the workpiece. The individually slidable pins can thus be accurately positioned against the concave and convex surfaces of the air foil portion of the turbine blade, whereupon they are locked in position by means of a plate. In the preferred form of the invention, the pins have a substantially square cross-section and a workpiece contacting portion consisting generally of hemispherical configuration. The pins are arranged in a plurality of vertical columns and horizontal rows for ease of manipulation.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 3 is an end elevational view, partly broken away, of one end of the fixture;

FIG. 4 is an end elevational view, partially broken away, illustrating the other end of the fixture;

FIG. 5 is a fragmentary view, partly in elevation and partly in cross-section on a somewhat enlarged scale illustrating the manner in which the air foil portion is clamped between the movable pins of the fixture; and FIG. 6 is a view in perspective of one of the pins of the fixturing device.

DESCRIPTION OF THE PREFERRED EMBODIMENTS

Figure 1:
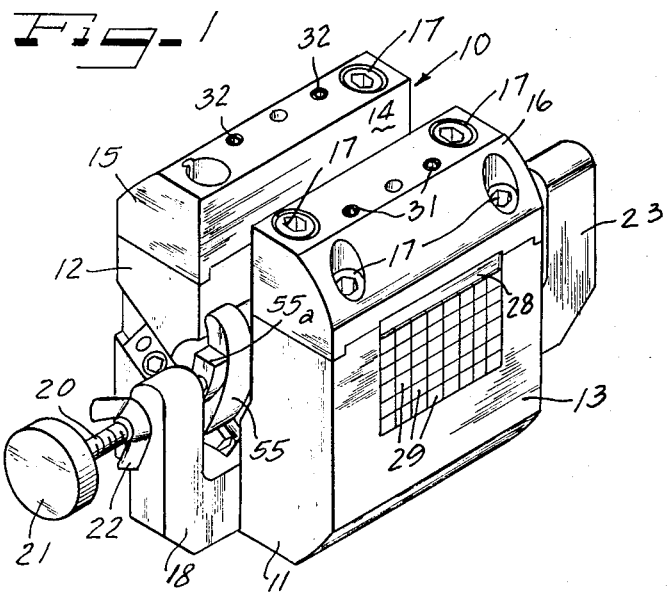
FIG. 1 is a view in perspective of the fixture of the present invention holding a turbine blade in clamped engagement therein.

In FIG. 1, reference numeral 10 indicates generally the improved fixturing device of the present invention including a base 11 and upstanding sidewall portions 12 and 13 extending in spaced parallel relationship from the base 11 to define a slot 14 therebetween. A pair of pressure members 15 and 16 are secured to the sidewalls 12 and 13, respectively, by means of a plurality of recessed screws 17.

Figure 2:
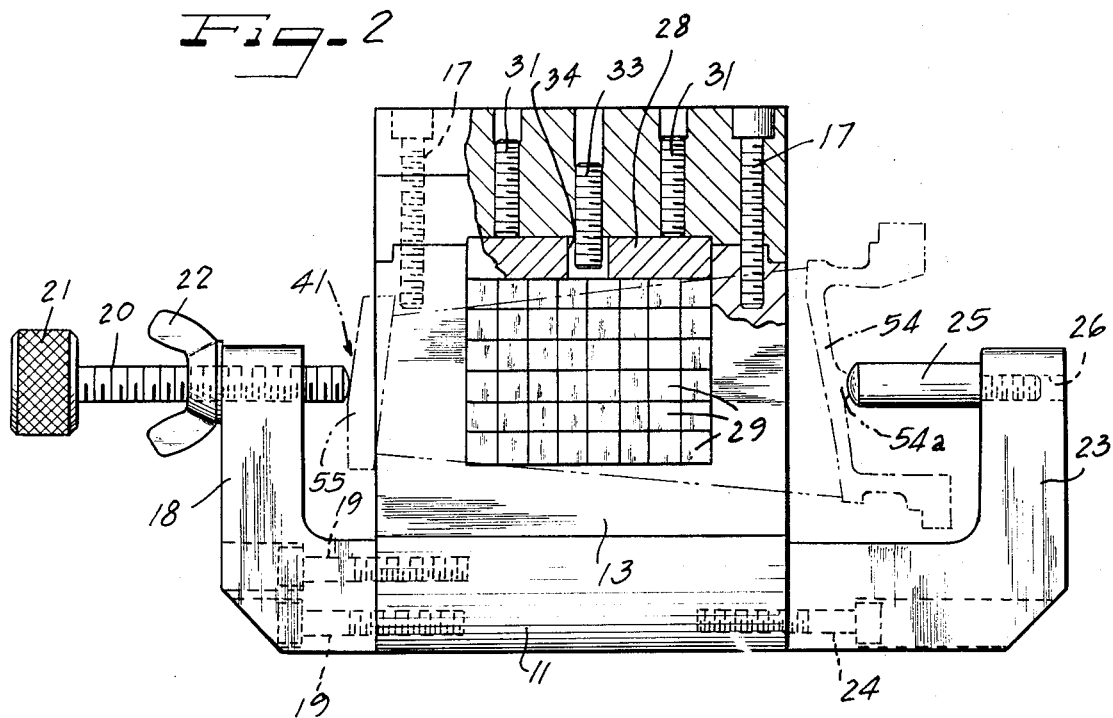
FIG. 2 is a side elevational view of the fixture, partially broken away, illustrating the positioning of the turbine blade within the fixture by means of dashed lines.

A forward angle arm 18 is secured to the base 11 by means of screws 19 as best seen in FIG. 2 of the drawings. The angle arm 18 receives an adjustment screw 20 in threaded engagement, the screw 20 having a knurled adjusting knob 21 thereon and a wing nut 22 to lock the screw 20 in a predetermined position for holding a blade in the fixture.

Similarly, an angle arm 23 is provided on the opposite end of the fixture and is held against the opposite side of the base 11 by means of screws 24. An abutment pin 25 is received in tight threaded engagement within a threaded bore 26 provided in the angle arm 23.

Confined between the top pieces 15 and 16 and the respective sidewalls 12 and 13 are a pair of pressure plates 27 and 28 which act against a plurality of individually movable pins 29, the construction of the individual pins being best illustrated in FIG. 6 of the drawings. As will be seen from that figure, the body of the pins 29 consists of four planar surfaces which have a substantially square cross-section. The heads of the pins are formed with projections 30 which are substantially hemispherical in configuration.

As illustrated in FIGS. 1 and 2, the pins 29 are arranged in vertical columns and horizontal rows with their planar faces abutting. The pins are provided with a coating of oil or other lubricant to facilitate sliding movement between the individual pins.

The plates 27 and 28 clamp the pins 29 into a preselected configuration by means of screws 31 which bear against the plate 28 and screws 32 which bear against the plate 27. An additional screw 33 is provided within an aperture 34 of the plate 28 to limit the amount of lateral movement of the plate 28 relative to the pins.

Turing now to FIG. 3, it will be seen that at one end of the fixture there is provided a seating means consisting of an insert 35 which has an aperture engaging a locating pin 36 extending from the sidewall 12 and is clamped to the sidewall 12 by means of a recessed screw 37. The insert 35 is received within a groove 38 formed in the sidewall 12 and has a precisely formed notch 39 at the forward end thereof, the notch 39 cooperating with a pin 40 extending from the sidewall 13 to precisely confine one of the air foil edges of a turbine blade 41. At the other end of the fixture there is an insert 42 which has a slot 43 enabling the insert 42 to be adjustably positionable along the sidewall by means of a screw 44. A shim 45 may be inserted between the insert 42 and a stationary piece 46 to limit the amount of movement of the insert 42. The insert 42 has a rounded end portion 47 which is arranged to abut a portion of the air foil portion of the blade as illustrated in FIG. 4. Another insert 48 is received within a groove 49 and has an aperture which is received on a positioning pin 50. A screw 51 clamps the insert 48 to the sidewall 12. The insert 48 is provided with an accurately shaped notch 52 against which a marginal edge portion of the main section of the blade is received. To further locate and hold the arcuate vane section of the blade in position, there is provided an angularly extending screw 53.

The turbine blade 41 has a root portion 54 having a locating button 54a thereon and a shroud portion 55 having a locating button 55a thereon. Initially, the arcuate vane portion of the blade 41 is positioned within the slot 14, with the locating button 54a abutting the positioning pin 25 and the screw 20 bearing against the locating button 55a. At one end, a portion of the marginal end of the vane portion is positioned between the notch 39 and pin 40, as shown in FIG. 3, while at the other end of the vane portion, the pin is supported between the notch 52 and the rounded end portion of the insert 42. The pins 29 are then manipulated inwardly until they abut the arcuate vane portion of the blade 41 as illustrated in FIG. 5. A row of pins 46 is superimposed over the rounded pins 29, the pins 56 having doubled surfaces 57 which engage the blade near its extreme marginal edge. With the pins firmly engaging the concave-convex air foil portion of the blade, the pins are locked in position by tightening of the screws 31 and 32 which serves to clamp the pressure plates 27 and 28 against the pins. With the blade thus securely held in exactly the correct relation, the appropriate datum planes may be ground or machined into the root and shroud portions of the vane to define extremely accurately located surfaces for subsequent machining operations.

From the foregoing, it will be understood that the fixture of the present invention provides an extremely accurate means for holding a complex air foil shape in proper position for further fabricating operations without the disadvantages of the encapsulation technique now in use.

It will also be understood that various modifications can be made to the described embodiments without departing from the scope of the present invention.

I claim as my invention:

1. A fixture for holding an airfoil shaped workpiece comprising a fixture base, opposed sidewalls extending from said base, said sidewalls being spaced sufficiently to provide a slot of sufficient width to receive the airfoil portions of said workpiece, abutment means on opposite sides of said slot arranged to abut the top and bottom of said workpiece while said airfoil portion is in said slot, at least one of said abutment means being axially adjustable, a pair of adjustable seating means, one at each of the ends of said sidewalls arranged to seat portions of said airfoil portion therein, and a plurality of individually movable pins extending from each of said sidewalls into said slot to firmly engage the airfoil portion between said pair of seating means.

2. The fixture of claim 1 in which each of said adjustable seating means is slidably received along the ends of said sidewalls and securable thereto.

3. The fixture of claim 2 in which said adjustable seating means consists of a notched bar slidable into and out of engagement with said airfoil portion.

* * * * *